(12) United States Patent
Holderied et al.

(10) Patent No.: US 11,542,052 B2
(45) Date of Patent: Jan. 3, 2023

(54) THERMOFORMING PACKAGING MACHINE AND METHOD FOR CONTROLLING A FILM PUNCH

(71) Applicant: MULTIVAC SEPP HAGGENMUELLER SE & CO. KG, Wolfertschwenden (DE)

(72) Inventors: Thomas Holderied, Dietmannsried (DE); Marcus Pfister, Bad Groenenbach (DE); Maximilian Hetz, Haldenwang (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 1 day.

(21) Appl. No.: 17/236,189

(22) Filed: Apr. 21, 2021

(65) Prior Publication Data
US 2021/0323711 A1 Oct. 21, 2021

(30) Foreign Application Priority Data
Apr. 21, 2020 (DE) .......................... 102020204997.1

(51) Int. Cl.
B65B 61/06 (2006.01)
B29C 51/46 (2006.01)
B65B 7/16 (2006.01)

(52) U.S. Cl.
CPC ............ B65B 61/065 (2013.01); B29C 51/46 (2013.01); B65B 7/164 (2013.01)

(58) Field of Classification Search
CPC ......... B29C 51/00; B29C 51/18; B29C 51/26; B29C 51/261; B29C 51/262;
(Continued)

(56) References Cited

U.S. PATENT DOCUMENTS 5,953,972 A * 9/1999 Nakagawa ............ B30B 15/148
83/72
6,550,361 B1 4/2003 Davis, II et al.
(Continued)

FOREIGN PATENT DOCUMENTS

EP 2 586 591 A1 5/2013
EP 3 109 017 B1 11/2017

OTHER PUBLICATIONS

European Search Report (with English Machine Translation) dated Sep. 23, 2021, Application No. 21164926.4-1016, Applicant Multivac Sepp Haggenmueller GmbH & Co. KG, 17 Pages.
(Continued)

Primary Examiner — Chelsea E Stinson
(74) Attorney, Agent, or Firm — Brooks Kushman P.C.

(57) ABSTRACT

A thermoforming packaging machine includes a forming station for thermoforming troughs in a film web, a filling path for filling products into the troughs, a sealing station for sealing the troughs, a chain guide for guiding a transport chain for the film web, a transverse cutting device for cutting the film web in a direction transverse to the transport direction, a longitudinal cutting device for cutting the film web in the transport direction, and a control device for controlling processes running on the thermoforming packaging machine. The transverse cutting device comprises a film punch, an adjustment drive which can be controlled by the control device for closing and opening the film punch, and a detection unit which is connected to the control device and which has at least one sensor which is configured to detect, per processing cycle, a force progression occurring at the film punch during opening and closing.

20 Claims, 5 Drawing Sheets

(58) Field of Classification Search
CPC ... B29C 51/264; B29C 51/265; B29C 51/266; B29C 51/46; B65B 7/00; B65B 7/164
See application file for complete search history.

(56) References Cited

U.S. PATENT DOCUMENTS

| | | | |
|---|---|---|---|
| 10,207,451 B2* | 2/2019 | Baur | B65B 31/028 |
| 10,766,655 B2 | 9/2020 | Ehrmann et al. | |
| 2003/0126963 A1 | 7/2003 | Davis, II et al. | |
| 2005/0274243 A1* | 12/2005 | Shiroza | B21D 24/10 |
| | | | 83/13 |
| 2016/0046063 A1* | 2/2016 | Baur | B65B 31/028 |
| | | | 264/318 |
| 2016/0376048 A1* | 12/2016 | Ehrmann | B26D 5/00 |
| | | | 83/72 |
| 2017/0369196 A1* | 12/2017 | Robbins | B65B 9/04 |

OTHER PUBLICATIONS

German Search Report dated Dec. 9, 2020, Application No. 10 2020 204 997.1, Applicant MULTIVAC Sepp Haggenmueller Se & Co. KG, 6 Pages.

* cited by examiner

THERMOFORMING PACKAGING MACHINE AND METHOD FOR CONTROLLING A FILM PUNCH

CROSS-REFERENCE TO RELATED APPLICATIONS

This application claims foreign priority benefits under 35 U.S.C. § 119(a)-(d) to German Patent Application No. DE 10 2020 204 997.1, filed Apr. 21, 2020, which is incorporated by reference in its entirety.

TECHNICAL FIELD

The disclosure relates to a thermoforming packaging machine. The disclosure further relates to a method on a thermoforming machine.

BACKGROUND

A generic thermoforming packaging machine is known from EP 3 109 017 B1. A film punch for cutting through a film, which is assumed therein to be previously known, is adjusted between an open and a closed position by means of a pneumatic cylinder. In the associated force progression, there is an abrupt slump in force causing the cutting of the film to be indicated in the force diagram. Nevertheless, the pneumatic cylinder continues to build up a pressure force until a pressure bar of the film punch presses against a knife of the film punch with a preset maximum force before the punching process is completed and the pressure of the pneumatic cylinder is released. However, the film punch repeatedly working up to the preset maximum force level per cutting cycle results in high wear of the knife.

As an alternative to the embodiment described above, EP 3 109 017 B1 proposes another variant of a cutting process controlled by a servomotor, in which the knife of the film punch is supposed to be less stressed per cutting cycle compared to the pneumatic embodiment. For this purpose, the servomotor always moves the pressure bar to a preset working position which corresponds to a specific position of the servomotor. The working position can be calibrated weekly, daily or at each machine start of the thermoforming packaging machine by moving the pressure bar to con-tact with the knife when the film is not present and storing a detectable angle for this on the out-put shaft of the servomotor in the control system as the working position. However, this increases the calibration effort, since the film punch has to be readjusted, especially when changing the film.

SUMMARY

An object of the disclosure is to provide a thermoforming packaging machine and a method for controlling a film punch, the operation of which is even more efficient than the solutions used in the prior art so that, above all, shorter manufacturing cycles and a lower degree of wear of the components used on the film punch can be achieved.

The disclosure relates to a thermoforming packaging machine having a forming station for thermoforming troughs in a film web, a filling path for filling products into the troughs, a sealing station for sealing the troughs, a chain guide for guiding a transport chain for the film web, a transverse cutting device for cutting through the film web in a direction transverse to the transport direction, a longitudinal cutting device for cutting through the film web in the transport direction, and a control device for controlling processes running on the thermoforming packaging machine.

The transverse cutting device comprises a film punch, an adjustment drive which can be con-trolled by means of the control device for closing and opening the film punch, as well as a detection unit which is connected to the control device and which has at least one sensor which is configured to detect a force progression occurring at the film punch during opening and closing for each processing cycle.

It is characteristic of the intermittently operating thermoforming packaging machine that the control device is designed to carry out a dynamic adaptation of the control signal for opening and/or closing the film punch for each processing cycle of the film punch upon a temporary slump in force detected by means of the sensor during a tendential force increase in the force progression, by means of which a cutting of the film web by means of a knife of the film punch can be determined.

Contrary to a preset working position according to the state of the art, into which the film punch moves per processing cycle, as well as contrary to a preset maximum cutting force according to the state of the art, with which the film punch acts per processing cycle, in the disclosure, the signal detected on the basis of the slump in force in the force progression is used per processing cycle, i.e., dynamically for adapting the control signal of the control device for opening and/or closing the film punch. Thus, during operation of the thermoforming packaging machine, the force progression can be automatically optimized for each processing cycle of the film punch, as a result of which the operation of the film punch becomes even more precise and less subject to wear.

Due to the fact that the control signal at the control device is automatically adjusted during each processing cycle, i.e., during each cutting process, with regard to the event of the detected break-through of the film, the optimum mode of operation of the film punch can be regulated in a self-controlling manner on the thermoforming packaging machine. In the disclosure, in contrast to the previously known approach with a predetermined working position or maximum cutting force, the film punch operates dynamically per processing cycle with regard to the cutting of the film, i.e., depending on the time at which the cutting of the film can be detected, the subsequent force progression for opening and/or closing the film punch can be adapted accordingly per processing cycle.

A dynamic adaptation of the control signal could, for example, result from the fact that by detecting the break-through of the film, the control is adapted to slow down a stroke speed for closing the film punch, to stop closing the film punch abruptly or with a time delay before the film punch is completely closed, to control a force increase following the detection of the break-through of the film until the opening of the film punch with a lower temporal force change rate compared to a force change rate of the force increase detected before the break-through of the film, and/or to generate a start signal as a function of the slump in force, in particular in real time, whereby the opening of the film punch can be triggered with or without a time delay.

One variant provides that the sensor comprises a measuring socket and at least one strain gauge, which is attached to the measuring socket. This might be used to detect the force progression, in particular the slump in force occurring when the film is cut, by simple, inexpensive constructive means.

Preferably, the measuring socket is positioned pushed onto a vertical tie rod of the film punch. This allows the measuring socket to be attached to the film punch in a cost-effective manner and can be excellently integrated into the force flow of the film punch. Such a measuring socket could also be easily retrofitted to film punches that have already been delivered, i.e., to thermoforming packaging machines that have already been delivered. For its measuring application, the measuring socket could be arranged on the tie rod by means of simple handling.

One variant which is advantageous for measuring purposes is that the measuring socket is pre-tensioned on the tie rod by means of a (screw) nut when the film punch is in the open position. By pressing the film against the knife, i.e., when the film punch is closed, this pretension could be relieved at least until the film is cut, which can be detected by means of the strain gauge as a tendential force increase in the force progression. The pretensioning of the measuring socket enables the strain gauge attached to it in particular to quickly detect changes in the force progression of the film punch.

Preferably, the tie rod includes a threaded section for securing the nut. The threaded section can have a fine thread. This allows the pretension of the nut to be set particularly precisely. In addition, due to the increased self-locking of a fine thread, a better measuring result can be achieved for numerous processing cycles.

According to an embodiment, a compression of the measuring socket set along the tie rod by means of a nut is greater than a longitudinal extension of the tie rod occurring during operation of the film punch. This allows that the force progression when pressing the film against the knife can be detected by means of the resulting longitudinal elongation of the measuring socket.

The sensor technology used on the film punch could be improved if the strain gauge is configured as a semiconductor strain gauge and/or as a rosette strain gauge. This could allow the force progression to be detected even more precisely and, above all, a progression of the slump in force, i.e., the cutting of the film, to be detected even more precisely in real time, so that the control signal of the control system can be dynamically adapted in a fast-response manner in order to optimize the opening and/or closing of the film punch for each processing cycle.

Preferably, the strain gauge is arranged on an inner circumference of the measuring socket. In this variant, the measuring socket is provided as a housing, so to speak, for the strain gauge and protects it from undesirable influences, such as moisture. For improved hygienic operation of the film punch, the measuring socket can be made of stainless steel.

Preferably, when the film punch is closed, the film web is displaced out of its transport plane and pressed towards the knife. This allows the film web to be additionally tensioned, which can accelerate the cutting process and leads to a better cut edge on the packaging material.

The film punch is particularly robust if the knife is mounted in a fixed position. The adjustment drive can be a servomotor configured to adjust a pressure bar of the film punch. Upon closing the film punch, the pressure bar can press the film web against the knife positioned above it from below. By cutting the film web, the pressure bar and the knife come into contact with each other, which usually results in an abrupt slump in force in the measured force progression.

It is expedient if the control device has a controller which is configured to dynamically adapt, as a control signal, a control current for the servomotor of the transverse cutting device for opening and/or closing the film punch. Thus, it is possible to approach an angle of an output shaft of the servomotor as a function of the detected cutting of the film web per processing cycle, which angle results dynamically in response to the cutting of the film web, wherein a retraction of the servomotor, that is, the opening of the film punch, preferably occurs at the same time as the adjusted angle is reached or with an adjustable delay time.

It is conceivable that carrying out the dynamic adaptation of the control signal for opening and/or closing the film punch is dependent on reaching a predetermined amount of the slump in force and/or on detecting a delay time following the slump in force. Thus, disturbance variables in the force progression could be filtered out.

A preferred variant provides that the control device is configured to determine a thickness of the film web to be cut on the basis of the detected force progression. This can be done by detecting a position of the pressure bar in the closed state of the film punch when the film web is not pre-sent and comparing it with a position at which the pressure bar is located when the tendential in-crease in force in the force progression begins with the film present. It is conceivable that a working parameter of the transverse cutting device and/or the longitudinal cutting device can be automatically adjusted on the basis of the detected thickness.

It is conceivable that the nominal force detected for cutting the film web can be used to dynamically adapt a control signal for controlling operation of the downstream longitudinal cutting device. This enables coordinated interaction of the transverse and longitudinal cutting devices and thus precise separation of packages along the thermoforming packaging machine.

It is possible that the control device is configured to determine a degree of wear of the knife on the basis of a start time detected in the force progression, on the basis of the force detected for the cutting and/or on the basis of an amount of the temporary slump in force. The degree of wear can preferably be visually displayed on the thermoforming packaging machine on a display de-vice provided thereon. It is conceivable that a display device is provided directly on the film punch. In this context, it is conceivable that service or maintenance intervals for the knife of the film punch are automatically indicated.

One embodiment provides that the thermoforming packaging machine has a display on which the force progression of the film punch can be visualized and/or the control device is configured to generate a control algorithm on the basis of the detected force progression and/or on the basis of several detected force progressions. The display can be present as part of the display device, whereby it is preferably present as part of an operating panel which is available in the area of the sealing station.

It is conceivable that the control device is configured to revise the control algorithm when the thermoforming packaging machine is switched off or when operation of the thermoforming packaging machine is terminated, on the basis of detected data of the processing cycles of the film punch and/or other work stations of the thermoforming packaging machine carried out from the start of the machine with the aim of having an update thereof available on the control device when the thermoforming packaging machine is restarted.

The disclosure also relates to a method for a thermoforming packaging machine for detecting a cutting of a film web by means of a film punch of a transverse cutting device provided on the thermoforming packaging machine. For this purpose, a force progression caused by opening and closing of the film punch is detected at least in sections at the transverse cutting device by means of at least one sensor per processing cycle of the film punch.

It is characteristic of the method according to the disclosure that a control device of the thermoforming packaging machine carries out a dynamic adaptation of a control signal for opening and/or closing the film punch per processing cycle of the film punch in response to a temporary slump in force detected by means of the sensor during a tendential increase in force in the force progression, as a result of which the cutting of the film web by means of a knife of the film punch is detected.

The work of the film punch can thus be optimally adapted for each processing cycle because the thermoforming packaging machine, in particular the film punch, reacts dynamically to the cutting of the film web in a self-controlling manner. This considerably reduces the amount of calibration required and at least slows down wear on the knife used on the film punch.

A dynamic adaptation of the control signal could be carried out, for example, in that the detection of the break-through of the film causes the control system to slow down a stroke speed for closing the film punch, to stop closing the film punch abruptly or with a time delay before the film punch is completely closed, to control a force increase following the detection of the break-through of the film until the opening of the film punch with a lower temporal force change rate compared to a force change rate of the force increase detected before the break-through of the film, and/or to generate a start signal as a function of the slump in force, in particular in real time, as a result of which the opening of the film punch is triggered with or without a time delay.

According to an embodiment of the disclosure, the sensor measures the force progression per processing cycle of the film punch by means of at least one strain gauge arranged in the force flow on a pretensioned measuring socket. The measuring socket is mounted by means of a nut on a vertical tie rod of the film punch under pretension, i.e., with compressive load, so that the measuring socket mounted in a compressed manner also expands during cutting of the film web in accordance with an extension of the tie rod, as a result of which the force progression per processing cycle of the film punch can be precisely determined by means of the strain gauge attached thereto.

Preferably, the temporary slump in force is approximately in the form of a triangular progression, which allows the abrupt punching of the film web to be reliably detected. The triangular progression or a comparable abrupt progression can trigger the adjustment of the control signal so that the film punch is opened simultaneously or with a certain delay.

BRIEF DESCRIPTION OF THE DRAWINGS

In the following, embodiments of the disclosure are explained in more detail with reference to the Figures.

Identical components are provided with the same reference signs throughout the Figures.

DETAILED DESCRIPTION

Figure 1:
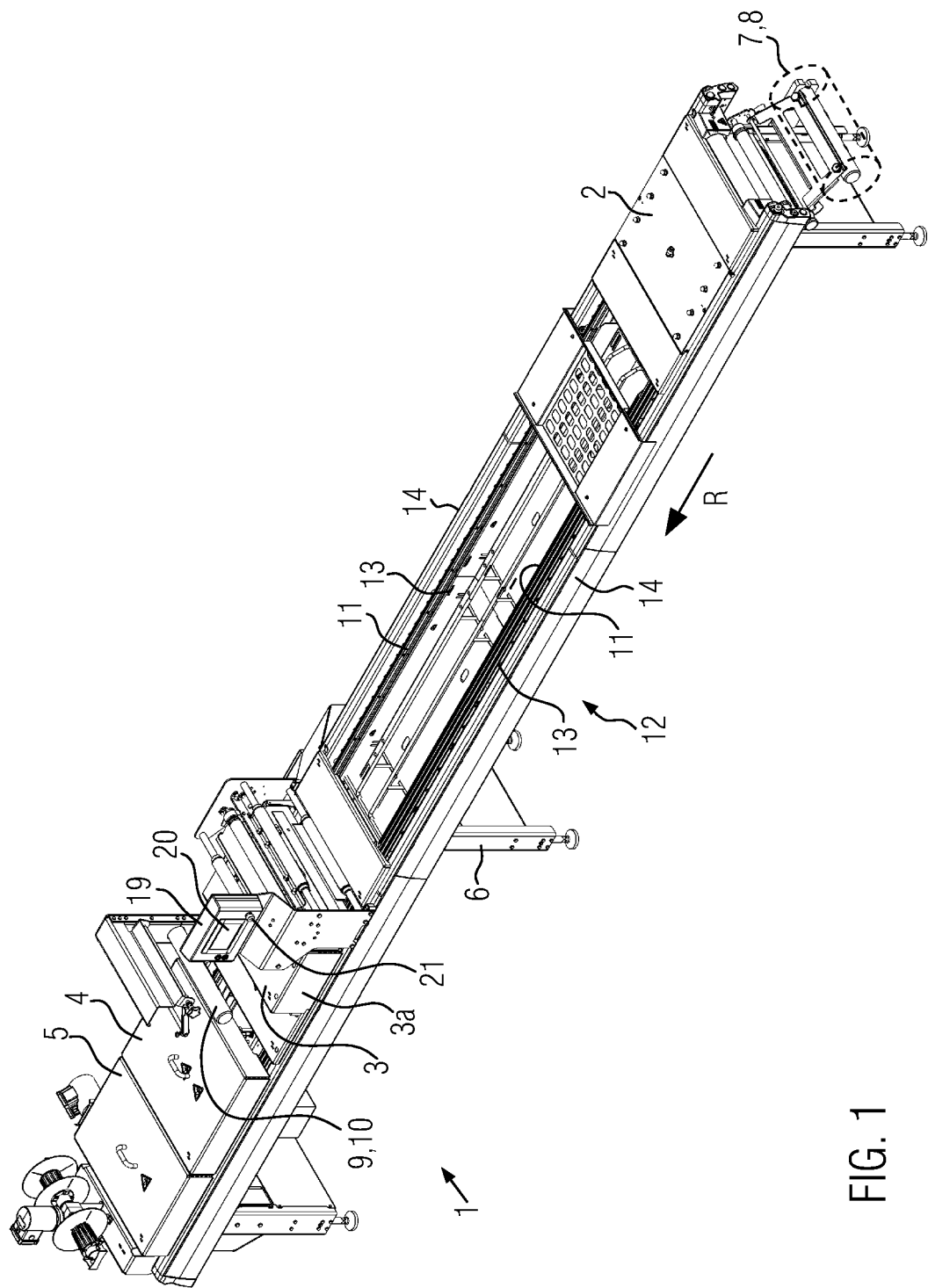
FIG. 1 shows a thermoforming packaging machine in a perspective view.

FIG. 1 shows a perspective view of an intermittently operating thermoforming packaging machine 1 according to the disclosure. The thermoforming packaging machine 1 has a forming station 2, a sealing station 3, a transverse cutting device 4, and a longitudinal cutting device 5, which are arranged in this order in a transport direction R on a machine frame 6. On the input side, a feed roller 7 is located on the machine frame 6, from which a lower film 8 is drawn off. Furthermore, the thermoforming packaging machine 1 has a transport chain 11 which grips the lower film 8 and transports it further in transport direction R per main working cycle.

In the embodiment shown, the forming station 2 is configured as a thermoforming station in which troughs are formed in the lower film 8 by thermoforming, for example by means of compressed air or vacuum. The forming station 2 can be configured such that several troughs are formed next to each other in the direction perpendicular to the transport direction R.

A filling path 12 is provided downstream of forming station 2 in transport direction R, in which the troughs formed in the lower film 8 are filled with products.

The sealing station 3 comprises a hermetically sealable chamber 3a in which the atmosphere in the troughs can be evacuated and/or replaced by gas flushing with an exchange gas or a gas mixture, for example, prior to sealing with the upper film 10 dispensed from an upper film receptacle 9.

The transverse cutting device 4 comprises a film punch 15 (see FIG. 2A) which cuts the lower film 8 and the upper film 10 (hereinafter also referred to as film web 8, 10) in a direction transverse to the transport direction R between adjacent troughs. In this context, the transverse cutting device 4 operates such that the lower film 8 is not separated over its entire width, but is not cut through at least in an edge region. This allows a controlled onward transport through the transport chain 11.

The longitudinal cutting device 5 can be configured as a knife arrangement with which the lower film 8 and the upper film 10 are cut between adjacent troughs and at the lateral edge of the lower film 8 in the transport direction R so that separated packages are present downstream of the longitudinal cutting device 5.

The right and left transport chains 11 of the thermoforming packaging machine 1, which grip the lower film 8 on both sides, are each guided in a chain guide 13. The chain guides 13 are each protected from the outside by a side panel 14 of the thermoforming packaging machine 1 and, if necessary, are attached to the side panel 14. The side panel 14 can be a sheet metal part.

The thermoforming packaging machine 1 further comprises a control device 19 having the task of controlling and monitoring the processes running in the thermoforming packaging machine 1. A display device 20 with operating elements 21 is used to visualize or influence the process sequences in the thermoforming packaging machine 1 for or by an operator.

Figure 2A:
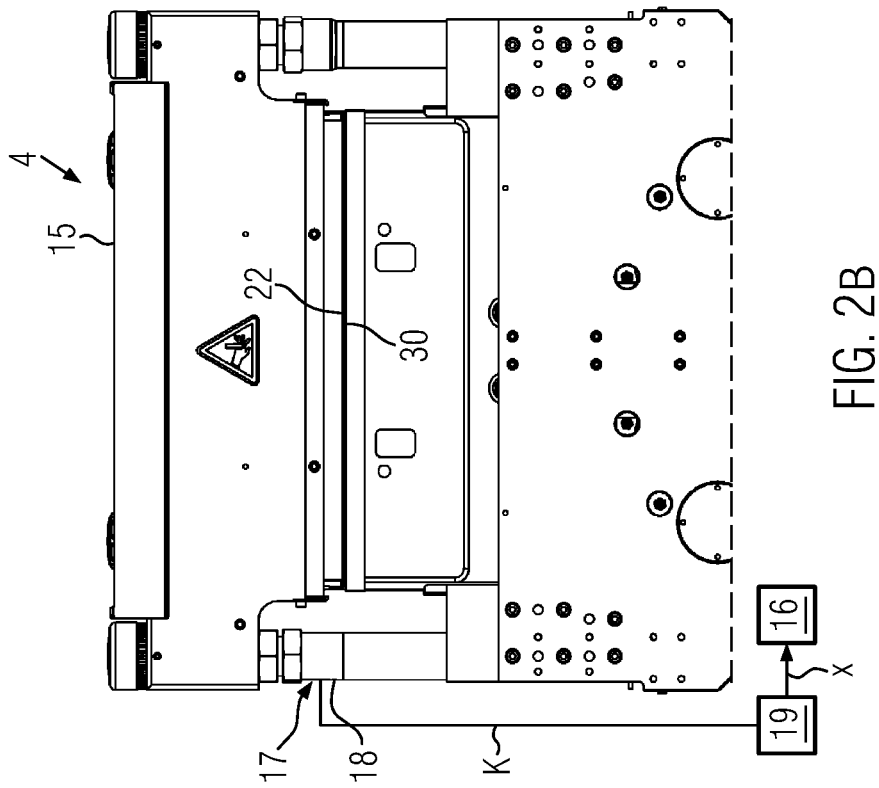
FIG. 2A shows a transverse cutting device in the form of a film punch of the thermoforming packaging machine in the open position.

FIG. 2A shows the film punch 15 of the transverse cutting device 4. In FIG. 2A, the film punch 15 is in an open position. FIG. 2A shows in schematic view that the control device 19 is functionally connected to an adjustment drive 16 of the film punch 15. The adjustment drive 16 is configured to open and close the film punch 15 and may comprise a servomotor. Furthermore, the film punch 15 comprises a detection unit 17, which is functionally connected to the control device 19 and comprises a sensor 18, which is configured to detect a force progression K (see FIG. 5B) occurring at the film punch 15 during opening and closing per processing cycle.

The film punch 15 has a knife 22 which is mounted in a fixed position as shown in FIG. 2A. Furthermore, the film punch 15 has an adjustable pressure bar 30 which is arranged in a lowered position in FIG. 2A. The adjustable pressure bar 30 is adjusted in height by means of the adjustment drive 16, thereby pressing against the stationary knife 22 from below during a processing cycle for cutting the film web 8, 10.

Figure 2B:
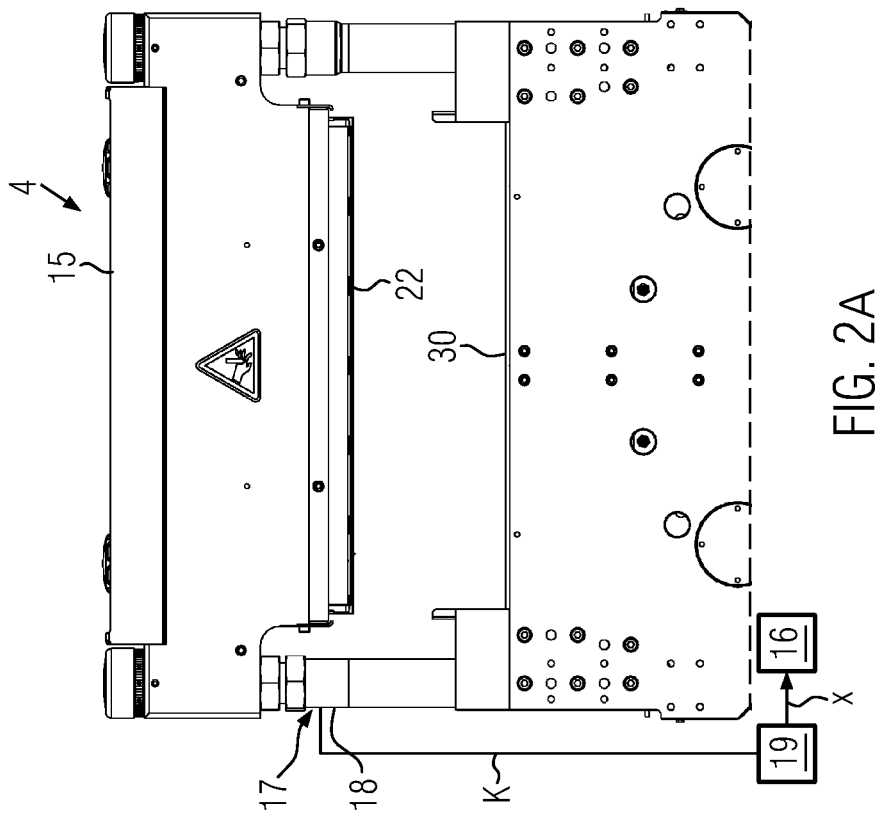
FIG. 2B shows the transverse cutting device of FIG. 2A in closed position.

In FIG. 2B, the knife 22 and the pressure bar 30 are arranged in contact with each other. The film punch 15 is therefore in a closed position in FIG. 2B. With the film web 8, 10 clamped in between, the force progression K can be detected by means of the sensor 18 of the detection unit 17 and forwarded to the control device 19. On the basis of the force progression K, the adjustment drive 16 of the film punch 15 can be dynamically controlled by adapting a control signal x.

Figure 3:
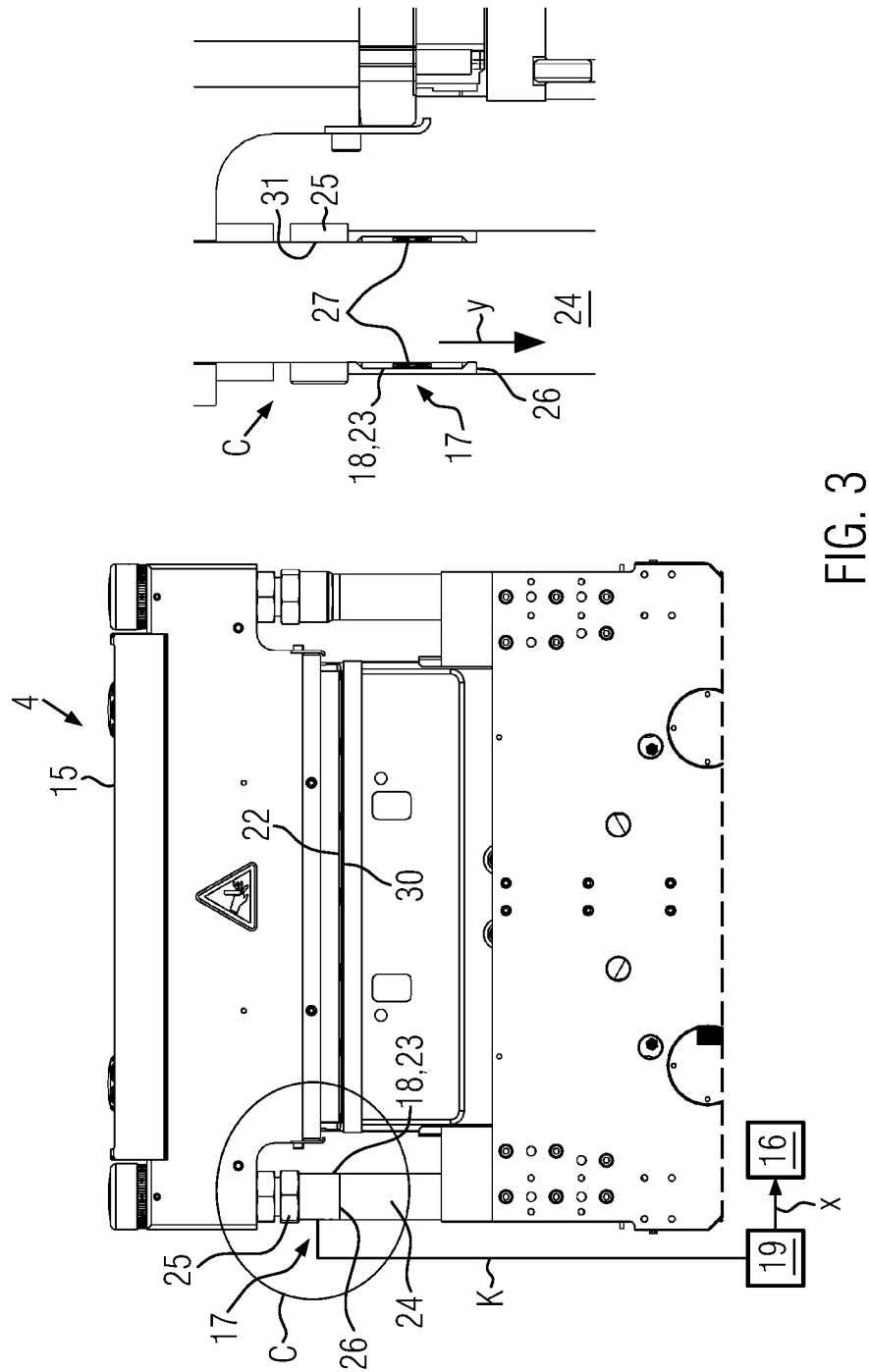
FIG. 3 shows the film punch with a measuring socket and its enlarged section.

FIG. 3 shows an enlarged view of the film punch 15, in particular an enlarged section of the detection unit 17. The detection unit 17, in particular the sensor 18, is provided in the form of a measuring socket 23. The measuring socket 23 is pushed onto a vertical tie rod 24. According to FIG. 3, the measuring socket 23 is pretensioned on the tie rod 24 by means of a nut 25. The tie rod 24 has a threaded section 31 for fastening the nut and for setting the pretension on the measuring socket 23.

During the punching process, when the pressure bar 30 presses against the knife 22 from below, the tie rod 24 elongates so that a support 26 formed thereon for the measuring socket 23 moves downward in the direction y, thereby causing the measuring socket 23 seated thereon to elongate in the direction y. The expansion of the measuring socket 23 due to the tensile stress of the tie rod can be detected by means of a strain gauge 27 attached to the measuring socket. This is shown in the enlarged section C of FIG. 3. In the enlarged section C of FIG. 3, the measuring socket 23 has opposing strain gauges 27 on its inner side 28 (see also FIG. 4). The strain gauges 27 measure the force progression K during the processing cycle of the film punch 15, i.e., in particular during the punching process, in which the pressure bar 23 presses the film web 8, 10 from below against the knife 22 positioned above it.

Figure 4:
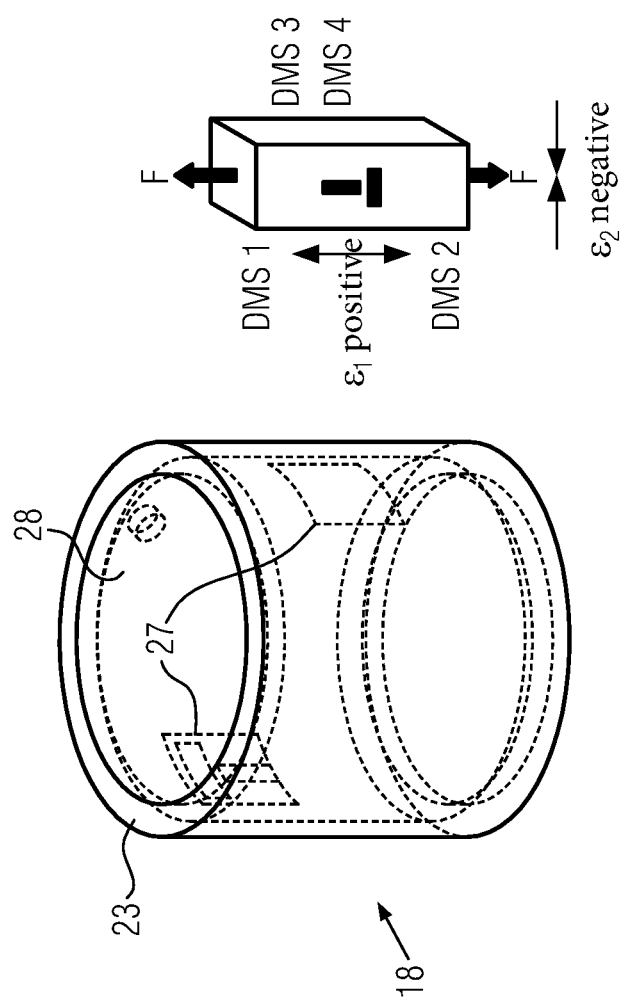
FIG. 4 shows the measuring socket with strain gauges in isolated view.

FIG. 4 shows the sensor 18 in isolated view. The measuring socket 23 is configured as a short tube piece and has opposing strain gauges 27 on the inside 28. At the measuring socket 23, the strain gauges 27 are switched by means of a full bridge (bridge circuit) in order to detect the force progression K during a processing cycle of the film punch 15.

On the film punch 15, the measuring socket 23, which is mounted on the tie rod 24 and pretensioned thereon, forms a cost-effective means for detecting the force progression K. A calibration of the measuring socket 23 can be carried out in a simple manner by adjusting the pretensioning force by means of the nut 25. Due to the arrangement of the measuring socket 23 on the tie rod 24, influences due to a change in temperature and/or bending of the tie rod 24 are substantially compensated. The strain gauges 27 can also be well protected against external influences by the measuring socket 23 surrounding them and can be easily replaced.

Figure 5A:
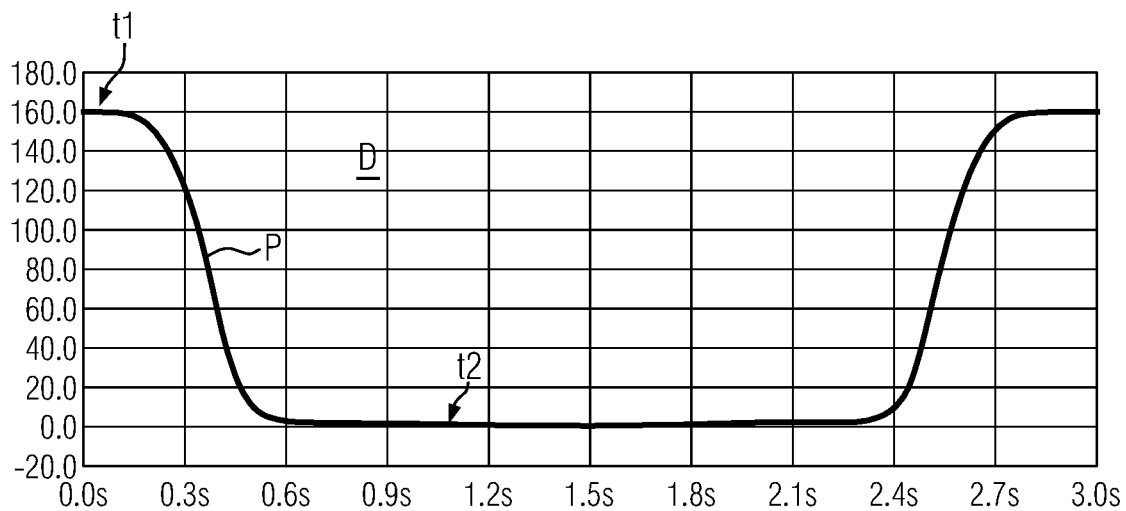
FIG. 5A shows a diagram illustrating a positional displacement of an adjustable pressure bar of the film punch during a cutting process.
Figure 5B:
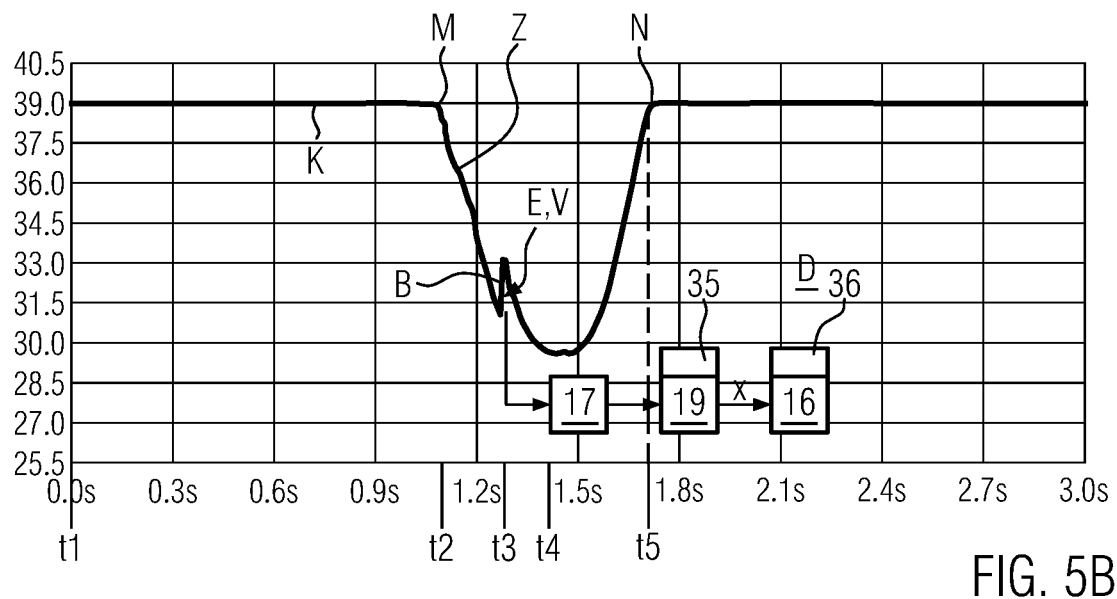
FIG. 5B shows a force progression that can be detected at the film punch during a processing cycle.

FIG. 5A shows a positional displacement P of the pressure bar 30 and FIG. 5B shows the corresponding force progression K during a processing cycle D of the film punch 15.

When the film punch 15 is open at the start time t1 of a processing cycle D, the pressure bar 30 is in the position shown in FIG. 2A.

At time t2, the pressure bar 30 and the knife 22 clamp the film web 8, 10 between them. As the pressure bar 30 presses the film web 8, 10 from below against the knife 22 positioned above it, the film web 8, 10 is cut, which is illustrated in the force progression K shown in FIG. 5B by the abrupt slump in force E at the cutting time t3. Here, a tendential increase in force Z in the force progression K decreases abruptly. This means that the film web 8, 10 is completely cut and the pressure bar 30 is in contact with the knife 22.

FIG. 5B shows schematically that the force progression K determined by means of the detection unit 17, in particular the determined slump in force E, is detected by the control device 19, which is configured to dynamically adapt the control signal x for opening the film punch 15 in response. In particular, a controller 35 of the control device 19 can be used for the control signal adaptation. The control signal x which is re-determined again and again for each processing cycle D regulates the control of the adjustment drive 16, in particular a servomotor 36, of the film punch 15 in order to control the pressure bar 30 as a function of the detected cutting of the film web 8, 10.

According to FIG. 5B, the abrupt slump in force E has a triangular progression V. The triangular progression V and/or an amount B as a deflection for the slump in force E can be present as a prerequisite for a dynamic adaptation of the control signal x.

In response to the cutting of the film web 8, 10, the control device 19 can adapt the control signal x for the adjustment drive 16 such that, up to a time t4, the knife 22 and the pressure bar 30 are pressed further together on contact. The duration of the time interval t3-t4 can be set variably at the control device 19.

From time t4, the film punch 15 opens, i.e., the pressure bar 30 moves back into the open position, causing the measured force to decrease from time t4 until time t5. From time t5, the pressure bar 30 and the knife 22 are no longer in contact.

It is conceivable that the time t4 can be determined when an amount of force increase is reached during the time interval t3-t4, i.e., the control signal x is dynamically adjusted accordingly.

FIGS. 5A and 5B show that the beginning of the break-through of the film web 8, 10 is detected by the abrupt, temporary slump in force E in the force progression K. This allows the film punch 15 to be closed in each processing cycle D to such an extent that a break-through of the film web 8, 10 is detected. Furthermore, an unnecessary overload of the knife 22 can be avoided by closing the film punch 15 only until the break-through of the film web 8, 10 is detected or with a slight time delay.

On the basis of the force progression K described above, it is possible to detect whether a film web 8, 10 is present in the film punch 15 at all by evaluating characteristic points (such as the impact of the pressure bar 30 on the film web 8, 10 at time t2 and the exit of the pressure bar 30 from the knife 22 at time t5). If a film web 8, 10 is present, namely the positions M (impact of the pressure bar 30 on the film web 8, 10) and N (exit of the lower edge of the knife) differ, wherein these detection values M, N are identical in the case of a missing film. Upon detection of a missing film web 8, 10, an emergency stop function could be triggered on the thermoforming packaging machine 1.

What is claimed is:

1. A thermoforming packaging machine comprising:
    a forming station for thermoforming troughs in a film web;
    a filling path for filling products into the troughs;
    a sealing station for sealing the troughs;
    a chain guide for guiding a transport chain for the film web;
    a transverse cutting device for cutting the film web in a direction transverse to a transport direction;
    a longitudinal cutting device for cutting the film web in the transport direction; and
    a control device for controlling processes running on the thermoforming packaging machine;
    wherein the transverse cutting device comprises a film punch, an adjustment drive which can be controlled by the control device for closing and opening the film punch, and a detection unit which is connected to the control device and which has a sensor which is configured to detect, per processing cycle, a force progression occurring at the film punch during opening and closing;
    wherein the control device is configured to carry out, per processing cycle of the film punch, a dynamic adaptation of a control signal for opening and/or closing the film punch as a function of a temporary slump in force detected by means of the sensor during a tendential increase in force in the force progression, as a result of which a cutting of the film web by a knife of the film punch can be detected; and
    wherein the sensor comprises a measuring socket and at least one strain gauge attached to the measuring socket.

2. The thermoforming packaging machine according to claim 1, wherein the measuring socket is pushed onto a vertical tie rod of the film punch.

3. The thermoforming packaging machine according to claim 2, wherein the measuring socket is arranged pretensioned on the tie rod by means of a nut.

4. The thermoforming packaging machine according to claim 3, wherein a compression of the measuring socket set along the tie rod by means of the nut is greater than a longitudinal extension of the tie rod occurring during operation of the film punch.

5. The thermoforming packaging machine according to claim 1, wherein the at least one strain gauge is configured as a semiconductor strain gauge and/or as a rosette strain gauge.

6. The thermoforming packaging machine according to claim 1, wherein the at least one strain gauge is arranged on an inner circumference of the measuring socket.

7. The thermoforming packaging machine according to claim 1, wherein when the film punch is closed, the film web is displaced out of its transport plane in a direction of the knife.

8. The thermoforming packaging machine according to claim 1, wherein the control device comprises a controller which is configured to adapt, as a control signal, a control current for a servomotor of the transverse cutting device for opening and/or closing the film punch.

9. The thermoforming packaging machine according to claim 1, wherein the control device is configured to determine a thickness of the film web to be cut based on the detected force progression.

10. The thermoforming packaging machine according to claim 1, wherein the control device is configured to determine a degree of wear of the knife based on a start time detected in the force progression and/or an amount of the temporary slump in force.

11. The thermoforming packaging machine according to claim 1, wherein the thermoforming packaging machine has a display device, on which the force progression of the film punch can be visualized and/or the control device is configured to generate a control algorithm based on the detected force progression.

12. A method of a thermoforming packaging machine for detecting a cutting of a film web by means of a film punch of a transverse cutting device provided on the thermoforming packaging machine, the method comprising:
    detecting a force progression caused by opening and closing of the film punch at least in sections on the transverse cutting device by means of at least one sensor per processing cycle of the film punch, wherein the at least one sensor measures the force progression by means of at least one strain gauge attached to a pretensioned measuring socket; and
    carrying out a dynamic adaptation of a control signal for opening and/or closing the film punch per processing cycle of the film punch, by a control device of the thermoforming packaging machine, in response to a temporary slump in force detected by means of the at least one sensor during a tendential increase in force in the force progression, as a result of which the cutting of the film web is indicated by means of a knife of the film punch.

13. The method according to claim 12, wherein the temporary slump in force has approximately the shape of a triangular progression.

14. The method according to claim 12, wherein the temporary slump in force has approximately the shape of a triangular progression.

15. A thermoforming packaging machine comprising:
    a forming station for thermoforming troughs in a film web;
    a filling path for filling products into the troughs;
    a sealing station for sealing the troughs;
    a transverse cutting device for cutting the film web in a direction transverse to a transport direction of the film web;
    a longitudinal cutting device for cutting the film web in the transport direction; and
    a control device for controlling processes running on the thermoforming packaging machine;
    wherein the transverse cutting device comprises a film punch, an adjustment drive which can be controlled by the control device for closing and opening the film punch, and a detection unit which is connected to the control device and which has a sensor which is configured to detect, per processing cycle, a force progression occurring at the film punch during opening and closing;
    wherein the control device is configured to carry out, per processing cycle of the film punch, a dynamic adaptation of a control signal for opening and/or closing the film punch as a function of a temporary slump in force detected by means of the sensor during a tendential increase in force in the force progression, as a result of which a cutting of the film web by a knife of the film punch can be detected; and wherein the sensor comprises a measuring socket and at least one strain gauge attached to the measuring socket.

16. The thermoforming packaging machine according to claim 15, wherein the measuring socket is pushed onto a vertical tie rod of the film punch.

17. The thermoforming packaging machine according to claim 16, wherein the measuring socket is arranged pretensioned on the tie rod by means of a nut.

18. The thermoforming packaging machine according to claim 17, wherein a compression of the measuring socket set along the tie rod by means of the nut is greater than a longitudinal extension of the tie rod occurring during operation of the film punch.

19. The thermoforming packaging machine according to claim 15, wherein at least one of the at least one strain gauge is configured as a semiconductor strain gauge and/or as a rosette strain gauge.

20. The thermoforming packaging machine according to claim 15, wherein at least one of the at least one strain gauge is arranged on an inner circumference of the measuring socket.

\* \* \* \* \*